(No Model.)  F. RITTER.  7 Sheets—Sheet 1.
DENTAL CHAIR.

No. 553,042.  Patented Jan. 14, 1896.

Witnesses
Arch. M. Catlin.
C. M. Catlin

Inventor
Frank Ritter
by Benj. R. Catlin
Attorney

(No Model.) 7 Sheets—Sheet 4.
F. RITTER.
DENTAL CHAIR.

No. 553,042. Patented Jan. 14, 1896.

(No Model.) 7 Sheets—Sheet 5.
F. RITTER.
DENTAL CHAIR.

No. 553,042. Patented Jan. 14, 1896.

UNITED STATES PATENT OFFICE.

FRANK RITTER, OF ROCHESTER, NEW YORK.

DENTAL CHAIR.

SPECIFICATION forming part of Letters Patent No. 553,042, dated January 14, 1896.

Application filed April 6, 1895. Serial No. 544,330. (No model.) Patented in France May 21, 1895, No. 247,597.

*To all whom it may concern:*

Be it known that I, FRANK RITTER, a resident of Rochester, in the county of Monroe and State of New York, have invented certain new and useful Improvements in Dental Chairs, (for which a patent was granted to me in France on the 21st day of May, 1895, No. 247,597;) and I do hereby declare the following to be a full, clear, and exact description of the invention, such as will enable others skilled in the art to which it pertains to make and use the same.

The invention relates to dental chairs and has for its object to increase the utility and simplicity of the construction of such chairs, and the invention consists in the construction hereinafter described and particularly pointed out.

In the accompanying drawings, Figure 1 is a partial elevation.

Numeral 1 denotes a chair-base.

2 is a pedestal rotatably supported on the base.

3 denotes a seat-frame, and 4 its cross-bar.

5 is a plunger rigidly secured to the bar 4. This plunger is a piston-rod, and its foot is a piston adapted to be raised by fluid pressure and to be lowered automatically. The piston works in a fixed tube 6, which at its bottom communicates with an oil-reservoir and with a pump through suitable valved passages.

7 denotes a sliding steadying guide tube or cylinder, which near its foot fits the tube or piston-cylinder 6. It also fits an opening in the top of the pedestal and has a perforated cap 8 that fits the plunger. The main function of this sliding cylinder is to support the plunger laterally and obviate shaking, especially when the cylinder is locked, as will be explained. The guide-tube 7 has an exterior groove 7' to receive a key 7'' fast on the pedestal to prevent the independent rotation of the sliding guide-tube.

9 indicates pendants or guide-rods fixed to the cross-bar, preferably at each side of the plunger. They are made movable through sleeves 10 rigidly fixed to the steadying-cylinder 7 by arms integral with its cap 8.

11 indicates locking devices seated in recesses formed interiorly in the sleeves 10 and adapted to be operated each by the foot of a steadying-pendant 9 when it is pulled up against the bottom of the said device 11 with the effect to force the inclined faces of the part 11 against similar faces in the sleeve, as happens in the elevation of the chair-seat frame. This lock becomes inoperative by gravity at any time when the seat is free to descend. The cylinder 7 is locked by a similar device 12, bearing upon the interior of the pedestal.

13 denotes a spring normally drawing down the locking device 12 and making it operative.

14 is a treadle whereby the spring may be overcome and the lock disengaged to permit the tube 7 to descend. The lock 12 is automatically released by the friction of the tube when said tube is drawn up, as elsewhere explained.

The seat is raised by pumping a suitable liquid under the piston which forces up the plunger and seat-frame. In the lowest position of these parts the pendent guides 9 extend to near the top of the base, as shown in Fig. 1. When the plunger and seat-frame rise, the pendants 9 are drawn up through the sleeves 10 until their lower ends push up and make operative the locking devices 11, whereupon, through the medium of the arms and cap 8, the ascent of the seat-frame and its cross-bar continuing, the guide or steadying tube 7 is drawn up to any desired height.

The chair-seat is supported on a liquid column in usual manner. To lower it a valve 15 is opened and the liquid is forced by gravity from under the supporting piston or plunger into the oil-reservoir 16. This valve is opened by overcoming its lifting-spring and depressing the lower end of the valve below its seat by the same lever or treadle 14 which releases the lock 12, and simultaneously, so that the guide-tube 7 descends with the plunger.

To enable the valve to be opened by the lever, as stated, a rod 17 connects these parts in such manner that the lowering of the lever overcomes a spring which normally closes the valve and pushes the latter down into its open position.

As usual in dental chairs the pedestal supporting the parts above described rotates on the base and is provided with a lock, such as a screw 18, bearing against a friction-block 19, situated between the base and pedestal and carried by the latter.

The chair is adapted for the use of children by a supplementary seat-elevating device to raise the seat so that a child sitting on it can make use of the head-rest in its lower position.

Figure 2:
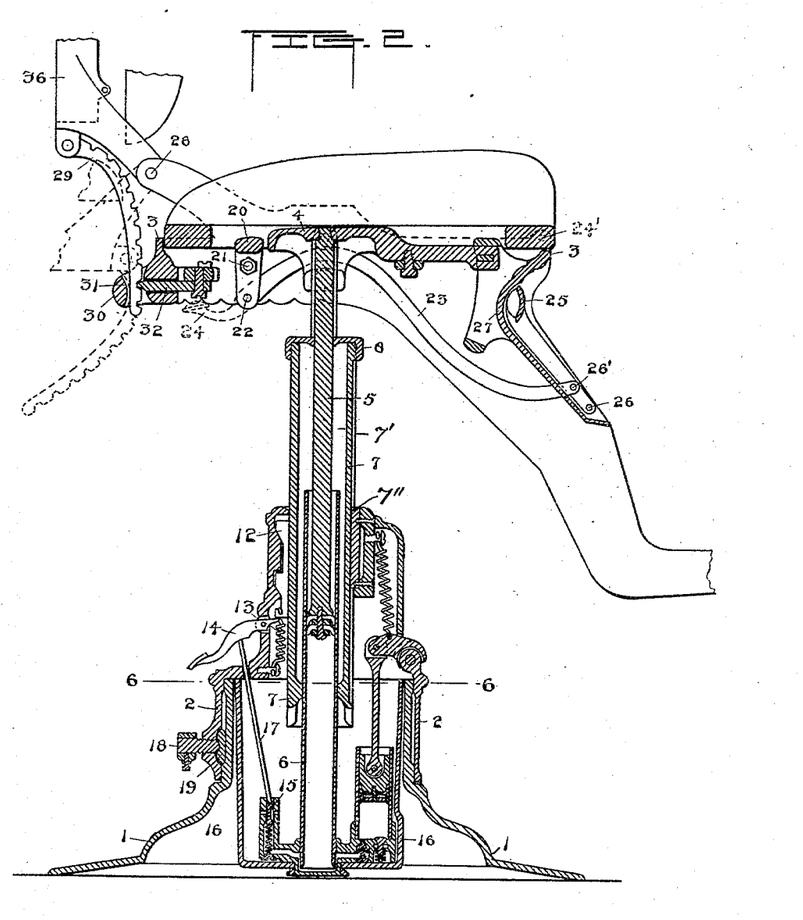
Fig. 2 is a partial central vertical section.
Figures 3, 4:
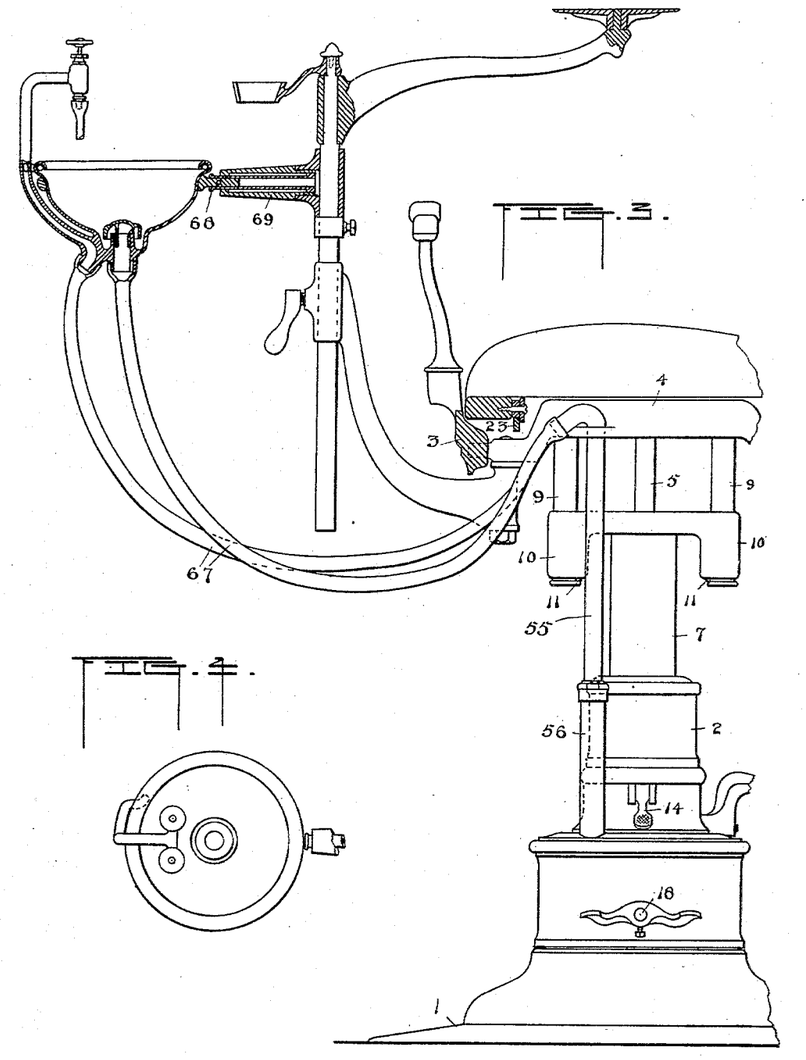
Fig. 3 is a partial rear elevation partly in section.
Fig. 4 is a plan of a spittoon.
Figure 5:
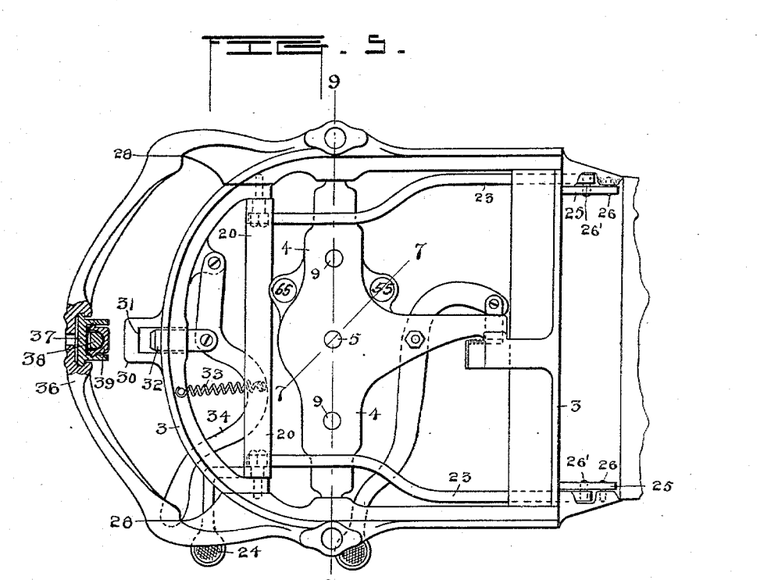
Fig. 5 is a plan of the chair, the seat being removed and the back-frame sectioned.
Figure 6:
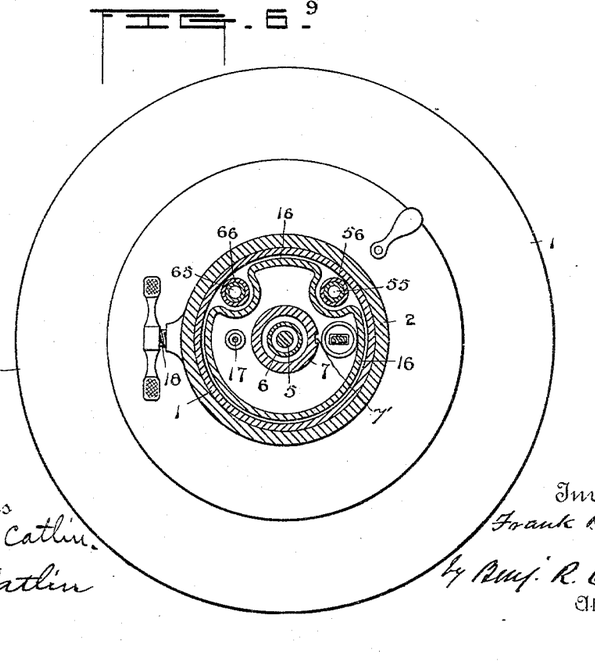
Fig. 6 is a section on line 6 6 of Fig. 2.

20 denotes a swinging frame pivoted at 21 in the seat-frame and pivotally connected at 22 with seat-raising bars 23. On the rear end of one of these is a foot-piece 24, by which it is operated. The bars 23 bear each against a friction-pulley (see Figs. 3 and 9) supported to turn on suitable screws or studs fixed to the seat. By pushing on the pedal the frame 20 is swung forward and bars 23 pushed forward and upwardly, with the effect to raise the seat, causing it to tilt about the pivots 24'. This also throws into operative position the child's foot-rest 25 having pivots at 26 and pivotally connected at 26' to said bars 23. When not in use this foot-rest is partially concealed in a pocket 27 formed in a downward extension from the seat-frame. To restore the level of the seat after raising it, as stated, it can be tipped backward.

The back-frame is pivoted to the seat-frame at 28 in usual manner.

29 indicates a curved rack pivotally connected to the back-frame and adapted to move through an opening in a stud or projection 30 fixed to the seat-frame. The bar is curved backwardly and downwardly with respect to the seat—that is, with its convex side toward the seat—and the concavity of the bar rests on or moves smoothly over a convex surface 31 formed in this stud.

32 denotes a holding bar or catch normally forced into engagement with the rack by a spring 33, and 34 is a lever or handle to aid in overcoming the spring and withdrawing the bar when it is desired to raise or lower the back-frame.

An upholstered back is pivoted to the back-frame extension at 35, and it is held in any desired position by a rack fixed to the back and a holding-pawl fixed to the frame. The back-frame comprises the outer part 36 and a main sliding extension 37. A two-part head-rest-bar support comprises a rear or interior portion made of brass and denoted by 38 and a front portion partially inclosing the first, denoted by 39. 40 denotes a handle movable vertically in a slot in the outer part 36 and adapted to lock the slide 37 in said part 36. The back-frame extension 37 can be moved up or down by means of this handle and then locked by simply turning the handle, which has a screw-thread connection suitable for the purpose. The parts 38 and 39 are moved by the handle 41. They have each a slight independent movement controlled by the cam-ring formed on said handle and fixed to pin 47, which is virtually a part of slide or bar 38. This cam is arranged to bear against a suitable face of a sleeve 39'', seated in the upper part of a yoke 39', attached to slide or bar 39. By suitably turning the cam-handle 41 the parts 38 and 39 are oppositely moved and their feet or inclined faces at 42 are wedged together and also to the main slide 37. This operation also locks the head-rest, as will appear.

39''' denotes a sleeve having an angular connection with the sleeve 39'' and held from rotation thereby, said sleeve 39'' being fixed to the part 39' of bar 39 by a screw or otherwise. The sleeve 39''' is however externally rounded at its upper part and permits when desired the rotation about itself of the parts 49 and 51. It also furnishes a bearing for the rotatable pin 47 which is a vertical extension of slide or bar 38. The construction is such that the head-rest bar can be rotated about sleeve 39''' and the pin 47 rotated in said sleeve and independently of the bars 38 and 39.

The head-rest comprises two upholstered pads 43, each pivotally supported by an arm 44 terminating in a hemisphere.

70 denotes a block provided with a stem or point entered in a hole in the end of arm 44 and held therein by a set-screw 72. 73 indicates a pivot passing through said block and through two ears fast on the pad, and 71 indicates stops on the block to limit the movement of the pad about said pivot 73.

Figures 9, 10, 11, 12:
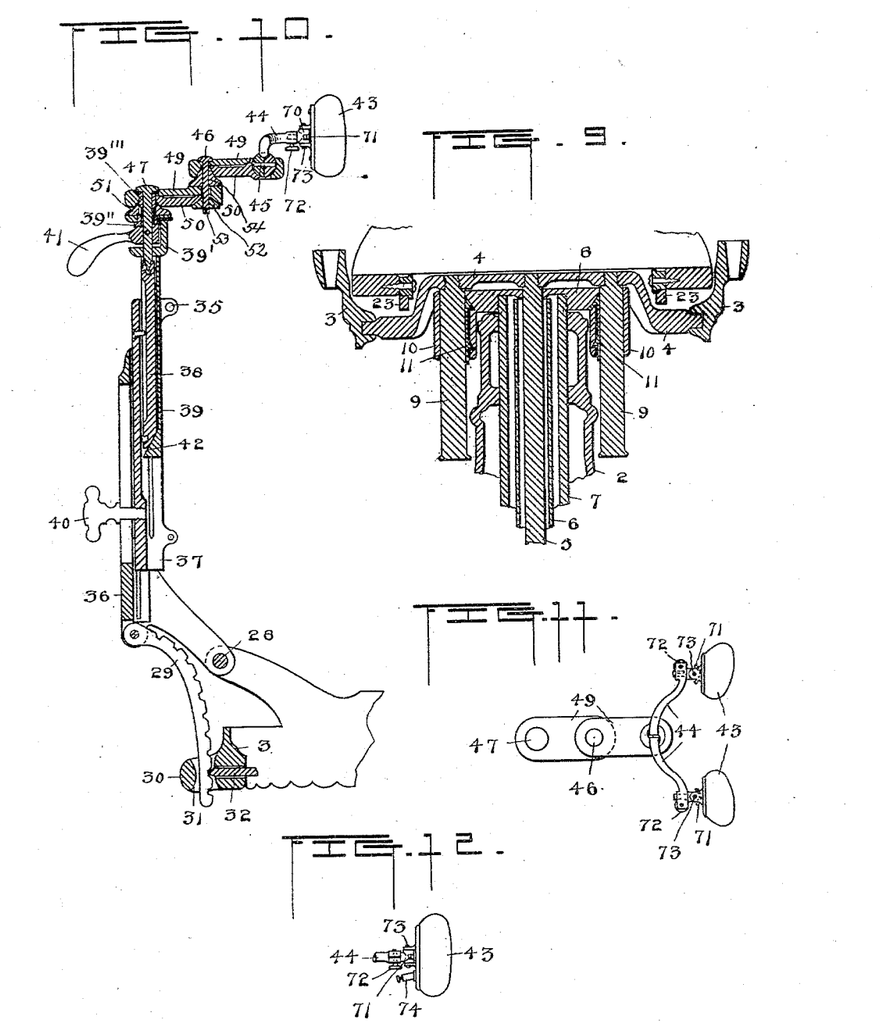
Fig. 9 is a partial section on line 9 9 of Fig. 5.
Fig. 10 is a central vertical section of the back-frame.
Fig. 11 is a plan of the head-rest.
Fig. 12 is a plan of a modified head-rest pad.
Figures 13, 14, 15, 16:
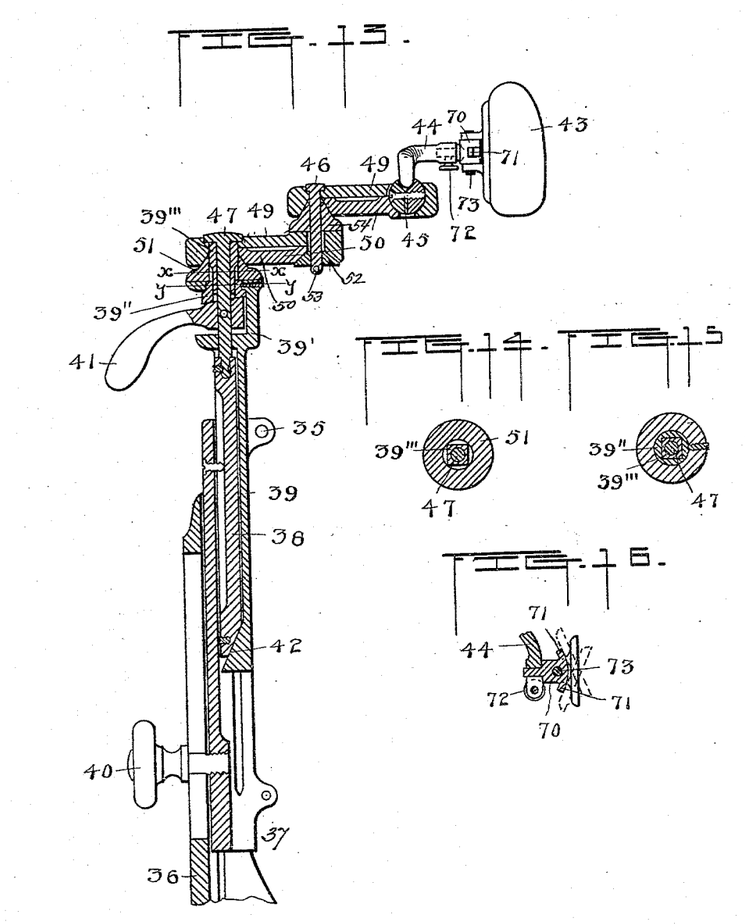
Fig. 13 is a central vertical section of the upper part of the back-frame and head-rest bar on an enlarged scale.
Figs. 14 and 15 are transverse sections on lines $x$ $x$ and $y$ $y$, respectively.
Fig. 16 is a partial section showing the connection of the head-supporting block and arm of the head-rest.

Referring to Fig. 12 of the drawings, 74 denotes a valved inlet for charging a pad with a fluid such as air or water to form a cushion for the head, which may be substituted for the usual stuffed cushion. The two hemispheres of arm 44 are secured together by a pivot or screw 45, as shown, and they together constitute the ball for a ball-and-socket joint. This construction permits the whole head-rest to be adjusted in any direction and also provides that the parts may be independently moved about said pivot 45 to or from each other. Heretofore these pads have in some cases been connected each with an individual supporting-arm by means of ball-and-socket joints. These require to be clamped after adjustment and the joint and clamping devices for each pad-supporting arm make the construction too complex for my purposes. Pads connected to and supported by ball-and-socket joints in each arm require clamping devices for said joints; otherwise the pads are too unstable and would permit a nervous or timid patient to dodge. By my improvement clamps or set-screws are used for the joint between the pad-blocks 70 and their supporting-arms, but each pad may at any time be automatically moved whenever required for comfort, the permissible motion however being small and in one direction.

In order that the pads may comfortably fit the patient's head two adjustments at least are required. One of these can be effected by the ball-and-socket joint comprising the two hemispheres or by means of the pin and set-screw 72, or both of these means of adjustment may be used. By these means the proper inclination toward each other in a vertical plane of the pads to correspond to the inclination of the lower parts of the back of the head may be secured. But a distinct adjustment of the pads in a transverse plane is also required to insure that heads which differ in width shall be comfortably fitted. The pads being so pivoted as to be freely movable in this direction within small limits, a slight pressure caused by a suitable turning or movement of the head will cause one or both pads to move until the head rests between them and the pressure on either side is equal in a horizontal plane passing through both pivots 73. Thus if the upper part of a pad bears against the head too much it will be automatically pressed outwardly and the whole length of the pad thereby brought in contact with the head. Such movement involves a slight bending of the neck and an opposite movement of the lower part of the other side of the head against the lower side of the corresponding pad, which insures that both pads shall fit the head in horizontal planes. The same operation follows a sidewise thrust of the head caused by fear or pain. If at such time both pads fit the head, they then both move with the head and about their pivots to maintain the fit, but only so far as the stops permit. To insure this result within useful and practicable limits stops such as 71 are necessary; otherwise the pads may be tilted so far as to bring the upper edge of one of them to bear directly against the upper part of the head and the lower edge of the other against the base of the head. Aside from the discomfort of this, the dodging of the head would interfere with dental or other operations. Such stops are necessary on both sides of each pivot to provide for the described operation in either direction and to insure the proper relative position of the pads under all circumstances.

From the above it will be understood that the pads are normally supported in planes oblique both to vertical and horizontal planes, whereby they may fit the head at its upper rear sides and also near its base—that is, both above and below the center of the ears on each side—so that the pads can be automatically and simultaneously moved by the head a limited distance in a direction transverse to their length.

The socket of the aforesaid joint is formed in the outer end of a compound head-rest bar consisting in the main of two horizontal members connected to each other by a transverse headed pin or bolt 46 and joined to the head-rest-bar support by a pin 47, having a head, which pin is fixed to the slide 38 of the said support, as shown. Each member of the head-rest bar comprises a hollow cover 49 inclosing a separately-movable beveled block 50. The ball of the main head-rest joint is locked in any desired position by the relative endwise movements of said parts 49 and 50 of the outer member of the bar. To produce this effect suitable pressure and a slight movement of various parts are propagated from the handle 41, which is fixed to the pin 47. Upon slightly rotating the handle and its cam in locking together the slides 38 and 39 said slides are oppositely moved with the effect to force the approximately frusto-conical sleeve 51 toward the head of the pin attached to the slide 38, whereby the adjacent cover 49 is bound between said parts 39 and 47. Simultaneously with this movement the adjacent beveled block 50 is crowded against a corresponding beveled sleeve 52 on the pin 46, which sleeve, bearing against a projection 53, thereupon pushes the said pin down and pulls its head against the adjacent cover 49, the intermediate beveled sleeve 54 being simultaneously forced against the adjacent beveled block 50 and the latter moved toward the head-rest and oppositely to the cover 49, whereby the ball of the ball-and-socket joint is locked.

The locking of the head-rest and the head-rest bar and of the bar 39 is simultaneously effected by the suitable manipulation of the handle 41, and when all are locked the ball of the ball-and-socket joint is fixed in its socket, the bar 39 is clamped by pin 47 to a cover 49, and the bars 38 and 39 are wedged together in their bearings.

The pivot 73 that connects each pad to its supporting-arm is parallel to the pad lengthwise thereof and in an approximately central line and close to the pad. The object of this construction is to provide for a small automatic tilting adjustment of each pad to cause it to bear full against the head and avoid the discomfort produced by contact with the edge of such a pad.

Heretofore spittoons supported upon brackets attached to dental chairs have been provided with flexible water-supply and waste tubes that extended from the spittoon to a fixed point or fixed points in the floor. In such constructions the tubes are liable to be thrown in the operator's way or to be twisted or their connections strained. To avoid these evils and support the flexible pipes or tubes in a comparatively out-of-the-way situation and with their lower ends supported in and rotatable with the seat-frame telescopic tubes are provided, both for the water supply and the waste, extending preferably from the seat-frame cross-bar to the level of the floor.

Figure 7:
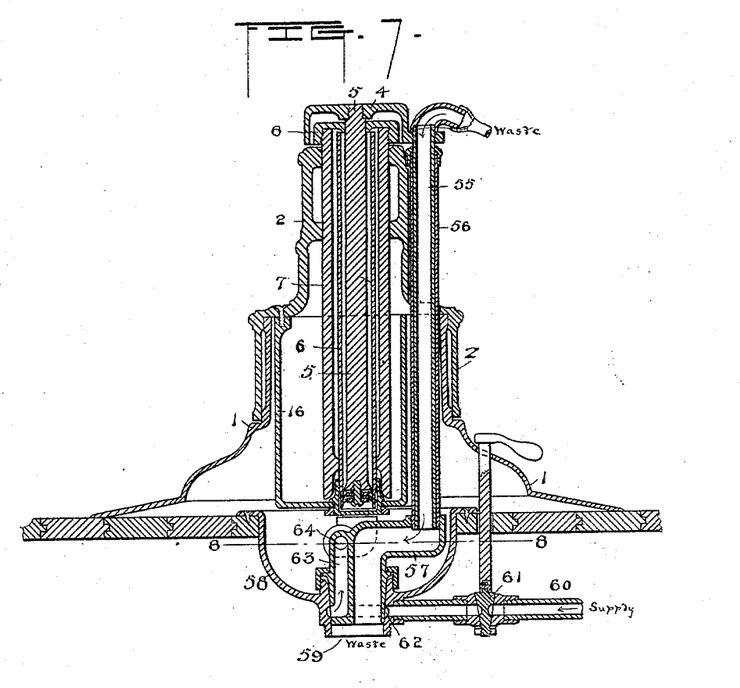
Fig. 7 is a section on line 7 7 of Fig. 5.
Figure 8:
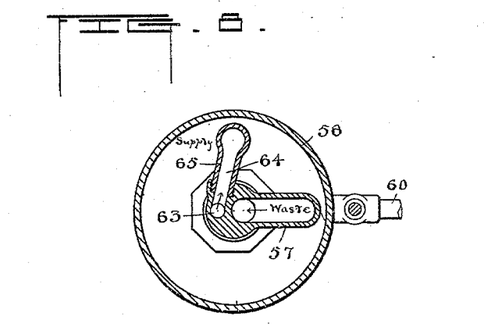
Fig. 8 is a section on line 8 8 of Fig. 7.

55 (see Fig. 7) denotes a tube fixed to the cross-bar and 56 a tube telescoping therewith and having its foot fixed to a coupling 57 rotatably supported by a water-tight joint in a bowl 58, or the like, fixed to the floor. 59 indicates the discharge-opening, which may be connected with a sewer or other suitable receptacle.

60 denotes an inlet-pipe for water and 61 a valve for opening and closing the same. This pipe communicates with a semiannular passage 62, a vertical passage 63, an inlet 64, and with a pipe 65, fixed to and rotating with the coupling 57. The pipes 55 and 65 are fixed to the cross-bar, and the telescopically-connected pipes 56 and 66 are connected to the rotating coupling 57, and all these pipes rotate with the chair-seat frame and with the pedestal. In addition to their other advantages they act as guides and aid in preventing a shaky or unsteady condition of the seat-frame and plunger, which is a consideration of especial importance in a chair providing for a large range of movement, as in the class to which the present invention pertains.

The telescoping pipes are preferably connected by communicating flexible pipes 67 with a spittoon supported by an extensible arm 68, movable in a supporting-sleeve 69, mediately supported on a swinging bracket in usual manner. The construction is such that the bracket can be swung horizontally and the sleeve 69 and its supporting-rod moved vertically and the arm also swung on said rod, and further, the spittoon can be moved to and fro from the rod by the telescoping connection of its arm 68 and sleeve 69. The flexible pipes 67 need descend but little if any below the chair-seat frame and can therefore be kept out of the way of the operator's feet under every adjustment. All these parts are connected to rotate with the chair-seat frame and the pedestal.

Heretofore a chair-seat has been raised and lowered by a screw steadied by a tube rigidly connected to and movable with said screw and having exterior bearings in a tube fixed in the pedestal and interior bearings on an internally-threaded tube, which was adapted to be rotated to raise and lower the said screw and seat.

It is characteristic of my improvement that the exterior of the steadying-tube bears on the pedestal and its interior on the plunger-tube and also on the plunger, whereby simplicity of construction is secured, and as the said steadying-tube is exterior to both the plunger and its cylinder it can be combined with other steadying devices outside and at a distance from the connection of the plunger to the cross-bar, and, if desired, outside the vertical lines of the pedestal, whereby a greater leverage is attainable to obviate shaking or wabbling of the seat.

Having thus fully described my invention, what I claim is—

1. In a dental chair, the combination of a rotating pedestal, a centrally situated seat-supporting plunger, steadying rods or guides fixed to the seat frame cross-bar in vertical planes outside the top of the pedestal, said cross-bar, the rod-receiving sleeves fitting said steadying rods and fixed to a steadying guide tube by an intermediate bar or the like fitting and movable on the plunger, and said sleeve and bar, all the parts being supported by and rotatable with the pedestal, substantially as set forth.

2. In a dental chair, the combination of the centrally situated seat-supporting plunger, steadying rods or guides fixed to the seat frame cross-bar, said cross bar, and the rod receiving sleeves mediately supported from the pedestal and fitting said rods, said pedestal, horizontally acting clamping devices normally inoperative and means for making them operative by the ascent and contact of the said rods to clamp the rods and sleeves together laterally and thereby obviate shaking or wabbling, substantially as set forth.

3. In a dental chair, the combination of a rotating pedestal, a seat-supporting plunger, steadying rods or guides fixed to the seat frame cross-bar, said cross-bar, the rod receiving sleeves connected together by a bar or the like that fits and is movable upon the plunger, and said plunger and bar, all the parts being supported by and rotatable with the pedestal, and a steadying cylinder having bearings in the pedestal and on the plunger tube and mediately fixed to said sleeves, substantially as set forth.

4. In a dental chair and in combination with a rotatable pedestal, a chair seat frame having a cross-bar, a seat frame elevating and lowering plunger, a plunger tube, parallel rods attached to the cross-bar and a supplemental guide, comprising a steadying tube movably supported in the pedestal and having a bearing thereon and on the plunger tube and provided with sleeves to receive said parallel rods, said sleeves being connected by a tube or part bearing on the plunger and movable independently thereof, all the parts being supported by and rotatable with the pedestal, substantially as set forth.

5. In a dental chair, the seat frame, the base, the rotating pedestal, the seat supporting plunger or piston, the plunger cylinder fixed in the pedestal, the sliding steadying tube situated between and bearing on both the pedestal and plunger tube and also bearing on the plunger and vertically movable with respect to each of said three parts, said steadying tube being exterior to both the plunger and plunger tube, and means for steadying said sliding tube situated at one side of the connection of the plunger with the seat frame whereby greater leverage is obtained to steady said tube and mediately to steady the plunger, all substantially as set forth.

6. In a dental chair, the combination of the pedestal, the plunger, the plunger cylinder, and the sliding steadying tube situated between and bearing on the pedestal and cylinder and on the plunger and movable with respect to each of the three, with an automatically operating locking device situated within the pedestal and bearing on it and on the steadying tube to lock it and the pedestal together, and a lock-tripping lever, substantially as set forth.

7. In a dental chair, the combination of the pedestal, the oil reservoir, the plunger, the plunger cylinder, the valved passage whereby oil may flow from the cylinder to the reservoir, the steadying tube situated between and bearing on the pedestal and cylinder and movable with respect to each, the device to automatically lock said tube and pedestal together, the lock-tripping lever and a connection between the lever and valve whereby the operation of the lever to release the lock to permit the steadying tube to descend also opens the valve to permit the plunger to descend, substantially as described.

8. In a dental chair, the combination of telescoping pipes one of which is fixed to the cross bar of the seat frame, and the other fixed to a coupling rotatably supported below the chair pedestal, a support for said coupling, and means for supplying liquid to the pipes and coupling, said pipes being rotatable with the seat frame and pedestal, and adapted to connect with a receptacle attached to the chair and communicate with it and also with a conduit or receptacle below the chair, substantially as set forth.

9. In a dental chair, in combination, the chair seat frame, the plunger supporting said frame, the plunger cylinder, the rotating pedestal supporting the plunger and cylinder, the rotatable coupling 57, supports for the coupling, conduits for admitting a liquid to the pipes and coupling, the pair of telescoping pipes, one of each pair being fixed to the seat frame and one to said coupling, said pipes and all the parts rotating with the pedestal, substantially as set forth.

10. In a dental chair, in combination the chair seat frame, the plunger, the pedestal, the telescoping pipes, the coupling 57, said pipes extending from the frame to the coupling and all the parts rotating with the pedestal, and a fixed bowl or support independent of the chair and having a seat for the coupling, substantially as set forth.

11. In a dental chair, the rotatable seat, devices for raising and lowering the same, a spittoon, a vertically extensible pipe having connection and communication with said spittoon and with a conduit fixed below the chair, all said parts except the conduit being rotatable with the chair and with the raising and lowering devices, substantially as set forth.

12. In a dental chair, the combination of the pedestal, two pairs of telescoping pipes, one pipe of each pair being fixed in the seat frame cross bar and the other pipe of each pair fixed to the coupling rotatably supported below the pedestal, said coupling, a spittoon, and flexible pipes by which the spittoon and telescoping pipes communicate, substantially as described.

13. In a dental chair, the combination of the pedestal, two pairs of telescoping pipes, one pipe of each pair being fixed in the seat frame cross bar and the other pipe of each pair fixed to the coupling rotatably supported below the pedestal, said coupling, a spittoon, and flexible pipes by which the spittoon and telescoping pipes communicate, said spittoon being mediately supported from the chair seat frame by a horizontally sliding arm, substantially as set forth.

14. In a dental chair, the combination of a seat frame pivotally supported to tilt in a vertical plane, a seat pivoted to the front of the frame, and devices for raising the seat by turning it on its pivots whereby the seat can be raised by tilting and its level restored, said devices comprising a swinging frame having pivots in the seat frame, bars pivotally supported in said frame, and friction rollers between the seat and bars, substantially as set forth.

15. In a dental chair, the combination of a seat and seat frame having a pivotal support with a swinging frame supported from the seat frame, and seat-elevating bars pivotally supported in said frame, whereby the seat may be independently raised and a child's foot rest connected to said bars and pivoted to the seat frame whereby the said rest may be moved into operative position simultaneously with the raising of the seat, substantially as set forth.

16. In a dental chair, the combination of the back frame pivoted to the seat frame, the curved bar fixed to the back frame, and provided with teeth on its convex side, the seat frame provided with the opening to receive the bar, said opening having a wall curved to correspond to the bar, the horizontal locking bar supported and movable in the seat frame, a lever pivotally connected to said bar and to the frame and adapted to release the same by a direct push from the rear, and a spring connecting the lever and frame to cause the bar to engage the rack teeth and lock the back frame, said opening being below the top of the seat frame and the bar curved forwardly and downwardly with respect to the seat, all substantially as set forth, whereby the back can be lowered to or below the level of the seat and locked, substantially as set forth.

17. In a dental chair having a back frame, a movable head-rest-bar-support comprising bars 38 and 39, a headed pin 47 rotatably connected to bar 38, a head-rest-bar, a head rest, a ball and socket joint intermediate the head rest and bar, and a cam fixed to the said rotatable pin and bearing mediately on bar 39 whereby the rotation of the pin clamps together said bar and the head rest bar, in combination with a sleeve 51, a beveled block 50 and devices intermediate said block and the ball and socket joint whereby the rotation of the pin locks said joint, substantially as set forth.

18. In a dental chair having a back frame, a movable head-rest-bar-support comprising bars 38 and 39, a headed pin 47 rotatably connected to bar 38, a head-rest-bar, a head rest, a ball and socket joint intermediate the head rest and bar, and a cam fixed to the said rotatable pin and bearing mediately on bar 39 whereby the rotation of the pin clamps together said bar and the head rest bar, in combination with a sleeve 51, a beveled block 50 and devices intermediate the said block and the ball and socket joint whereby the rotation of the pin locks said joint, and means for locking said extension bars together by the rotation of the said pin, said means comprising the inclined faces 42, substantially as set forth.

19. In a dental chair, the combination of a back frame pivoted to the seat frame, a sliding extension supported in said frame, an upholstered back supported by said extension a head-rest-bar-support comprising two bars adjustably supported in said back frame extension, a device for moving and locking the extension, and a device for separately moving and locking the head-rest-bar said latter device being fixed to a pin 47 having a pivotal connection with the head-rest-bar support whereby it may be rotated independently of said support to mediately clamp the head rest, substantially as set forth.

20. In a dental chair, the combination in a head rest of the pads each connected by one arm with a hemisphere, said arms and hemispheres, a central pivot passing through the ball formed by said hemispheres, a socket to hold the ball, and a clamping device to lock the ball in its socket and its halves together, substantially as set forth.

21. In a dental chair, the combination in a head rest of the pad-supporting arms, the pads normally supported in planes oblique both to horizontal and vertical planes, each pad being connected to said arms by a pivot 73 situated contiguous its back near its longitudinal center and permitting movement in the direction of one plane only, and stops 71 situated near and on each side of the pivot of each pad to limit its movement in said plane, all substantially as set forth whereby the pads embrace the head on both sides near its base and at its rear upper side parts and are moved simultaneously and to a limited extent by a lateral movement of the head.

22. In a dental chair, the combination of the chair back frame, the head-rest-supporting-bar, the head-rest-supporting-arms 44 each having a universal joint connection with said bar and having a socket, the pad-supporting-blocks having each a horizontal stem to enter a socket, and set screws whereby the head rest pads may each be independently adjusted about the axial line of said stem and fixed in its arms, substantially as set forth.

23. In a dental chair, the combination of the chair back frame, the head-rest-supporting-bar, the head-rest-supporting-arms 44 each having a universal joint connection with said bar and having a socket, the pad-supporting-blocks having each a horizontal stem to enter a socket, and set screws whereby the head rest pads may each be independently adjusted about the axial line of said stem and fixed to its arms, said pads being separately pivoted in the blocks to move to and from each other and provided with stops to limit such movement, substantially as set forth.

24. In a dental chair, a compound bar containing at one end a socket for a ball and socket joint for the head rest, and comprising two covers 49 pivoted together by a pin, one of the said covers being pivotally connected by a freely rotating pin to the back frame, said pins having each a bearing at substantially a right angle to the body of the pin upon the top of its corresponding cover, beveled blocks situated under said covers, beveled sleeves surrounding the pins and movable endwise thereof and means for moving the sleeves on the pins to draw their heads against the covers and practically at right angles thereto and to simultaneously crowd the blocks transversely to the pins whereby the ball is locked in its socket at one end of the bar and the other end of the bar locked to the back frame and the two members of the bar locked together by a lateral and also by a direct vertical pressure, substantially as set forth.

25. In a dental chair, the compound bar comprising two members each consisting of a cover 49 and beveled block 50 and also comprising a transversely disposed pin having a bearing on the cover substantially at right angles to the length of the pin, beveled sleeves movable with respect to the pins lengthwise thereof, and a cam ring to tighten the head of one of the pins against a cover and also push a block transversely of the pin thereby forcing the pin to a fixed bearing on the cover and also crowding the several sleeves and blocks together thereby forcing the head of a second pin to a fixed bearing on its cover and simultaneously transmitting pressure to the end of the bar to lock the head rest, substantially as set forth.

In testimony whereof I have signed this specification in the presence of two subscribing witnesses.

FRANK RITTER.

Witnesses:
JAMES H. MONTGOMERY,
CHAS. H. KONDOLF.